United States Patent [19]

Isozaki et al.

[11] Patent Number: 4,952,532

[45] Date of Patent: Aug. 28, 1990

[54] SINTERED BODY HAVING HIGH CORROSION RESISTANCE AND CONTAINING ZRB2

[75] Inventors: Kei Isozaki, Omuta; Hirotsugu Matsunaga, Okawa; Yasuo Imamura, Omuta, all of Japan

[73] Assignee: Denki Kagaku Kogyo Kabushiki Kaisha, Tokyo, Japan

[21] Appl. No.: 253,676

[22] Filed: Oct. 3, 1988

[30] Foreign Application Priority Data

Oct. 6, 1987 [JP] Japan ................................. 62-250728
Oct. 6, 1987 [JP] Japan ................................. 62-250730

[51] Int. Cl.$^5$ ...................... C04B 35/56; C04B 35/58
[52] U.S. Cl. ..................................................... 501/87
[58] Field of Search ........................................ 501/87

[56] References Cited

U.S. PATENT DOCUMENTS 3,433,471  3/1969  Alper ..................................... 501/87
3,669,695  6/1972  Iler et al. ............................... 501/87
4,678,759  7/1987  Kida et al. ............................. 501/92

FOREIGN PATENT DOCUMENTS 131884   1/1985  European Pat. Off. .
0189677  8/1986  European Pat. Off. .............. 501/87
58-190874 11/1983  Japan .
59-89749   5/1984  Japan ..................................... 501/87
59-107974  6/1984  Japan .

Primary Examiner—Mark L. Bell
Attorney, Agent, or Firm—Darby & Darby

[57] ABSTRACT

A sintered body containing $ZrB_2$ is obtained by sintering a starting powder material containing not less than 50% by weight of a starting powder mixture consisting essentially of $Cr_3C_2$ and a boride represented by the formula $(XB_2)_n$ wherein n represents an integer of 1 or 2 and when n is 1, X represents a zirconium atom and when n is 2, X represents a zirconium atom and a titanium atom, respectively and B represents a boron atom. The weight ratio of the $Cr_3C_2$: the boride is 50 to 0.5:50 to 99.5.

6 Claims, No Drawings

SINTERED BODY HAVING HIGH CORROSION RESISTANCE AND CONTAINING ZRB2

BACKGROUND OF THE INVENTION

This invention relates to a sintered body having a high corrosion resistance and containing $ZrB_2$.

The sintered bodies containing $ZrB_2$ have been studied and investigated for a long time and a number of patent aplications have been made on this subject. However, the known sintered bodies have not been found extensively to be commercially useful. For obtaining a sintered body containing $ZrB_2$, it is known to add silicates such as $MoSi_2$ or $ZrSi_2$, carbides such as $SiC$, $B_4C$ or $WC$, nitrides such as $TaN$, $BN$, $AlN$ or $HfN$, oxides such as $ZrO_2$ and metal powders as a sintering aid or additional components to $ZrB_2$ and to sinter the resulting mixture For obtaining a sintered body containing $ZrB_2$ and $TiB_2$, metal powders and tungsten carbide base super hard alloys may be used as a sintering aid, as disclosed in Japanese Laid-open Pat. Publication No. 44768/1986.

However, when the silicates such as $MoSi_2$ or $ZrSi_2$ or metal powders are used as the sintering aids, the resulting hard alloy is inferior in strength, corrosion resistance and anti-oxidation due to its tendency towards melting and decomposition under elevated temperatures. Although nitrides in general are superior in hardness and strength, these lack in anti-oxidation properties, corrosion resistance and thermal impact resistance. $ZrO_2$, mentioned herein as the oxide, is not satisfactory in anti-oxidation properties, while it is also poor in strength when used under elevated temperatures and under an oxidizing atmosphere due to transition from the tetragonal to the monoclinical system or vice versa. $SiC$, $B_4C$ or $WC$, used as the carbides, apparently are insufficient in oxidation resistance.

These sintering aids have several deficiencies, as discussed hereinabove, and cannot be practically employed in a form taking advantage of the strong points of $ZrB_2$ and $TiB_2$.

SUMMARY OF THE INVENTION

It is a principal object of the present invention to provide a sintered body having a high corrosion resistance.

It is another object of the present invention to provide a sintered body having superior corrosion resistance and anti-oxidation properties while exhibiting a high melting point, superior hardness and electrical conductivity without detracting from the properties of $ZrB_2$.

It is a further object of the present invention to provide a sintered body having high strength and superior thermal impact resistance.

These and other objects of the present invention will become apparent from the following description of the invention.

In accordance with the present invention, there is provided a sintered body having high corrosion resistance and containing $ZrB_2$ obtained by sintering a starting powder material containing not less than 50% by weight of a starting powder mixture consisting essentially of $Cr_3C_2$ and a boride represented by the formula $(XB_2)n$ wherein n represents an integer of 1 or 2 and when n is an integer equal to 1, X represents a zirconium atom and when n is an integer equal to 2, X represents a zirconium atom and a titanium atom, respectively and B represents a boron atom, the weight ratio of the $Cr_3C_2$ : the boride being 50 to 0.5: 50 to 99.5.

DESCRIPTION OF THE INVENTION

The present invention will be explained in detail hereinbelow.

It is an important feature of the present invention to combine a boride or borides consisting essentially of $ZrB_2$ or of $ZrB_2$ and $TiB_2$ with $Cr_3C_2$, whereby success has been achieved in overcoming the deficiencies of the prior art. That is, both $ZrB_2$ and $Cr_3C_2$, that are used for preparing a sintered body of the present invention, have been known to have superior corrosion-resistant properties. Since the $ZrB_2$ itself may be sintered only with extreme difficulties, a variety of sintering aids have been employed without, however, allowing the properties inherent in $ZrB_2$ to be exhibited satisfactorily. In addition, $Cr_3C_2$ in effect cannot be solely employed practically since it yields a sintered body which is brittle although it has rather high sintering properties. According to the present invention, the aforementioned deficiencies can be compensated for each other by the combined use of $ZrB_2$ and $Cr_3C_2$ as a starting powder mixture.

According to the present invention the sintered body is obtained by sintering a starting powder material containing a starting powder mixture. The starting powder mixture consists essentially of $Cr_3C_2$ and a boride represented by the formula $(XB_2)n$ wherein n represents an integer of 1 or 2 and when n is an integer equal to 1, X represents a zirconium atom and when n is an integer equal to 2, X represents a zirconium atom and a titanium atom, respectively and B represents a boron atom. The boride represented by the above formula $(XB_2)n$ is $ZrB_2$ when n is an integer equal to 1 and a mixture of $ZrB_2$ and $TiB_2$ when n is an integer equal to 2. The weight ratio of $Cr_3C_2$ : the boride is in the ranges of 50 to 0.5:50 to 99.5. With the weight ratio of $Cr_3C_2$ less than 0.5, the effects of the $Cr_3C_2$ as the sintering aid are practically nil, leading to loss of high corrosion resistance. With the weight ratio of $Cr_3C_2$ in excess of 50, the properties of the boride are impaired. According to the present invention, the aforementioned boride and $Cr_3C_2$ promote the sintering of each other to exhibit the excellent and unexpected results. According to the present invention, the $Cr_3C_2$ and the aforementioned boride are employed in weight ratio amounts that will together make up 100. That is, when the boride is $ZrB_2$, there is employed a starting powder mixture consisting essentially of 0.5 to 50 ratio by weight of $Cr_3C_2$ and 99.5 to 50 ratio by weight of $ZrB_2$. When the boride is composed of $ZrB_2$ and $TiB_2$, it is preferred that the above mixture be composed essentially of 50 to 0.5 ratio by weight of $Cr_3C_2$, 5 to 94.5 ratio by weight of $ZrB_2$ and 94.5 to 5 ratio by weight of $TiB_2$, with the $Cr_3C_2$, $ZrB_2$ and $TiB_2$ together making up 100 ratio by weight in total. With the $ZrB_2$ less than 5 ratio by weight, the properties inherent in $ZrB_2$, such as high melting point, high hardness or high corrosion resistance, are not exhibited. With the $TiB_2$ less than 5 ratio by weight, the properties of high strength naturally expected from the addition of $TiB_2$ are not exhibited.

In the context of the present invention, the starting powder mixture "consisting essentially" of $Cr_3C_2$ and boride means that the $Cr_3C_2$ need not necessarily be of 100 % purity. The $Cr_3C_2$ may thus include $Cr_7O_3$ and $Cr_4C$, as an example. Also it is preferred that $ZrB_2$, $TiB_2$ and $Cr_3C_2$ each be of a purity of not less than 99% and have a mean particle size of not more than 10μm and desirably not larger than 1 μm.

In the present invention, the starting powder mixture consisting essentially of the $Cr_3C_2$ and the boride is contained in an amount of not less than 50% by weight, based on the total weight of the starting powder material. According to the present invention, the starting powder material may contain 100% by weight of the starting powder mixture, that is, $Cr_3C_2$—$ZrB_2$ powders or $Cr_3C_2$—$ZrB_2$—$TiB_2$ powders. Or alternatively, the starting powder material may contain up to 50% by weight of one or more of additional starting powders. These additional starting powders may be selected from the group consisting of not more than 40% by weight of BN, not more than 25% by weight of AlN, not more than 25% by weight of $B_4C$, not more than 15% by weight of SiC, not more than 15% by weight of TiC, based on the total weight of the starting powder material, and mixtures thereof. As stated hereinabove, the additional starting powders are employed in an amount of less than 50% by weight based on the total weight of the starting powder material, so that, when 40% by weight of BN is employed, for example, 5% by weight of each of AlN and $B_4C$, for example, may be employed simultaneously. The additional starting powders may be employed within the range of the aforementioned upper limit for producing the desired properties. BN is employed for improving the thermal impact resistance of the sintered body. For preventing the strength from decreasing, it is employed in the range of not more than 40% by weight and preferably in the range between 5 and 20% by weight. AlN, on the other hand, is employed for promoting the sintering. Since the anti-oxidation properties and heat resistance of the sintered body are lowered with excessive amounts of AlN, it is employed in an amount of not more than 25% by weight and preferably in the range of from 5 to 20% by weight. $B_4C$ is employed for improving hardness of the sintered body. Since the anti-oxidation properties and heat resistance are lowered with excessive amounts of $B_4C$, it is employed in an amount of not more than 25% by weight and preferably in the range of from 5 to 20% by weight. SiC is effective as the sintering aid and for improving hardness and anti-oxidation properties of the sintered body. Since the corrosion resistance and the thermal impact resistance of the sintered body are lowered with excessive amounts of SiC, it is employed in an amount of not more than 15% by weight and preferably in the range of from 5 to 10% by weight. TiC is effective as the sintering aid and for improving the hardness of the sintered body. Since the anti-oxidation properties of the sintered body are considerably lowered with excessive amounts of TiC, it is employed in an amount of not more than 15% by weight and preferably in the range of from 5 to 15% by weight. It is preferred that the BN, AlN, $B_4C$, SiC and TiC employed as the additional starting powders be each of a purity of not lower than 99% and have a mean particle size of not more than 10 μm.

In preparing the starting powder material, the respective starting powders may be pulverized and subsequently mixed or, alternatively, the starting powders may be mixed and pulverized simultaneously. Any of the wet and dry methods may be employed for pulverizing the powders. In sintering, the starting powder material may be subjected to press molding or CIP (Cold isostatic pressing) molding in vacuum or under a neutral or reducing atmosphere of argon, helium or nitrogen, followed by sintering at pressureless conditions. The sintering temperature and the sintering time may be in the range of from 1400° to 2200° C. and in the range of 30 minutes to six hours, respectively, and are suitably selected in depending upon the composition and the particle size of the starting powder material. The HIP (Hot isostatic pressing) method or the hot pressing method may also be employed for molding.

In addition to the above powders, whiskers and/or fibers, such as $A_2O_3$, $SiO_2$, MgO, SiC, $B_4C$ or $Si_3N_4$, may be added to the starting powder material of the present invention for further improving the physical properties, such as the impact resistance or thermal impact resistance or fracture toughness of the sintered body.

The corrosion-resistant sintered body of the present invention has high melting point, hardness, conduction of electricity and are superior in corrosion resistance and anti-oxidation properties, without impairing the properties of borides, so that it can be used for applications such as electrodes, mechanical parts, heating elements or corrosion resistant components. For example, it can be used for level sensors, protective tubes for iron and steel making or electrodes used under elevated temperatures, such as gas arc welders, jigs for glass melting, such as crucibles or mold materials, extrusion dies for metal forming, or jigs such as nozzles or weirs, adapted for quenching and coagulating methods for the preparation of amorphous alloys.

EXAMPLES OF THE INVENTION

Example 1

Powders of $ZrB_2$ having a purity of not less than 99% (mean particle size: 3.33 μm) and the powders of $Cr_3C_2$ (mean particle size: 4.74μm) were ball-milled and molded by the CIP method for three minutes under a molding pressure of 2.7 tons/cm². The molded products were sintered under vacuum atmosphere (10−1 mmHg) at 1900° C. for 180 minutes for Example Run Nos. 2 to 10 and at 1500° C. for 360 minutes for Comparative Example Run Nos. 11 and 12. The physical properties of the sintered bodies, as measured by the following methods, are shown in Table 1.

(1) The thermal impact resistance was measured by a quenching strength measurement method. A flexural strength testing piece of 3×4×40 mm in size was used and heated to a prescribed temperature in an electrical oven. After the test piece was maintained at this temperature for one hour, it was quenched by being lowered into a water bath of 0° C. installed below the oven, and the flexural strength of the test piece was measured by three point bend test. The temperature difference ΔT between the heating temperature when the strength of the rest piece was lowered and the water temperature of 0° C. was determined.

(2) The corrosion resistance was determined from the amount of corrosion of a test piece of 3×4×40 mm in size which was immersed in a bath of molten ss-41 steel at 1600° C. for one hour under an argon atmosphere. In the Table, the marks O, Δ and X stand for no corrosion, some corrosion and considerable corrosion, respectively.

(3) The anti-oxidation properties were determined from the weight of the oxide after heat treatment at 1200° C. for 100 hours in atmosphere.

(4) Hv in the Table stands for Vicker's hardness.

TABLE 1

| Run No. | Composition (Wt. Part) ZrB$_2$ | Composition (Wt. Part) Cr$_3$C$_2$ | Relative Density (%) | Flexural Strength (Kg/mm$^2$) | Thermal Impact Resistance ΔT(°C.) | Corrosion Resistance |
| --- | --- | --- | --- | --- | --- | --- |
| 1 | 100 | 0 | 57.3 | 3 | — | — |
| 2 | 99.5 | 0.5 | 68.2 | 20 | 250 | |
| 3 | 97 | 3 | 80.7 | 25 | 300 | |
| 4 | 95 | 5 | 91.8 | 33 | 350 | |
| 5 | 90 | 10 | 97.3 | 36 | 400 | |
| 6 | 85 | 15 | 97.1 | 37 | 450 | |
| 7 | 80 | 20 | 96.7 | 35 | 400 | |
| 8 | 70 | 30 | 95.3 | 33 | 450 | |
| 9 | 60 | 40 | 93.9 | 27 | 350 | |
| 10 | 50 | 50 | 91.8 | 25 | 400 | |
| 11 | 30 | 70 | 88.5 | 12 | 200 | Δ |
| 12 | 20 | 80 | 95.2 | 18 | 200 | Δ |

Referring to Table 1, the sintered product consisting only of ZrB$_2$ exhibits poor sintering properties and lower strength On the other hand, the sintered body consisting only of Cr$_3$C$_2$ exhibits high sintering density but low strength (See Table 3, Run No. 4 hereinbelow) Addition of 0.5 to 50% by weight of Cr$_3$C$_2$ to ZrB$_2$ gives a sintered body having high sintering density and strength with superior thermal impact resistance and corrosion resistance. The higher the contents of ZrB$_2$ in the composition, the higher is the preferred sintering temperature. Conversely, the lower the content of Cr$_3$C$_2$ in the composition, the lower the preferred sintering temperature.

Example 2

Similarly to the preceding Example 1, powders of ZrB$_2$ and Cr$_3$C$_2$ and powders of BN, AlN, B$_4$C, SiC and TiC each having the purity of not less than 99%, were ball-milled and molded by the CIP method for three minutes at a molding pressure of 2.7 tons/cm$^2$. Each of the molded products was sintered in vacuum. The physical properties of the sintered products are shown in Table 2. The amounts of the additional powders, that is, BN, AlN, B$_4$C, SiC and TiC, are indicated by percent by weight based on the total weight of the starting powder material, the balance containing 90 parts by weight of ZrB$_2$ and 10 parts by weight of Cr$_3$C$_2$. The mean particle size of each of BN, B$_4$C, SiC and TiC is 5 to 10 μm.

It is seen from Table 2 that thermal impact resistance is markedly increased by the addition of BN and sintering properties are increased by the addition of AlN. It is also seen that hardness is markedly increased by the addition of B$_4$C and both sintering density and hardness are improved by the addition of both SiC and TiC.

TABLE 2

| Run No. | Additional Starting Powder (Wt. %) BN | AlN | B$_4$C | SiC | TiC | Relative Density (%) | Flexural Strength (Kg/mm$^2$) | Hardness (Hv) | Thermal Impact Resistance ΔT(°C.) | Anti-oxidation |
| --- | --- | --- | --- | --- | --- | --- | --- | --- | --- | --- |
| 1 | 40 | 0 | 0 | 0 | 0 | 80 | 10 | 900 | 700 | Good |
| 2 | 25 | 0 | 0 | 0 | 0 | 87 | 22 | 1100 | 700 | " |
| 3 | 10 | 0 | 0 | 0 | 0 | 93 | 28 | 1300 | 600 | " |
| 4 | 5 | 0 | 0 | 0 | 0 | 95 | 32 | 1400 | 500 | " |
| 5 | 0 | 25 | 0 | 0 | 0 | 92 | 28 | 1800 | 350 | " |
| 6 | 0 | 10 | 0 | 0 | 0 | 95 | 36 | 1850 | 350 | " |
| 7 | 0 | 5 | 0 | 0 | 0 | 97 | 39 | 1800 | 350 | " |
| 8 | 0 | 0 | 25 | 0 | 0 | 90 | 23 | 2700 | 350 | " |
| 9 | 0 | 0 | 10 | 0 | 0 | 92 | 26 | 2600 | 350 | " |
| 10 | 0 | 0 | 5 | 0 | 0 | 95 | 33 | 2200 | 400 | " |
| 11 | 0 | 0 | 0 | 15 | 0 | 95 | 24 | 1800 | 350 | " |
| 12 | 0 | 0 | 0 | 10 | 0 | 96 | 29 | 1850 | 300 | " |
| 13 | 0 | 0 | 0 | 5 | 0 | 95 | 34 | 1800 | 350 | " |
| 14 | 0 | 0 | 0 | 0 | 15 | 97 | 32 | 2000 | 350 | " |
| 15 | 0 | 0 | 0 | 0 | 10 | 97 | 38 | 1950 | 350 | " |
| 16 | 0 | 0 | 0 | 0 | 5 | 97 | 30 | 1900 | 400 | " |
| 17 | 10 | 10 | 0 | 0 | 0 | 94 | 33 | 1400 | 550 | " |
| 18 | 10 | 0 | 10 | 0 | 0 | 91 | 24 | 1700 | 450 | " |
| 19 | 10 | 0 | 0 | 10 | 0 | 93 | 26 | 1600 | 400 | " |
| 20 | 10 | 0 | 0 | 0 | 10 | 96 | 30 | 1600 | 400 | " |
| 21 | 0 | 0 | 10 | 0 | 10 | 96 | 31 | 2400 | 350 | " |

Example 3

Powders of ZrB$_2$ and TiB$_2$ each having a purity of not less than 99% (mean particle size: 3 to 4μm) and powders of Cr$_3$C$_2$ (mean particle size: 4 to 5 μm) were ball-milled and molded by the CIP method for three minutes at a molding pressure of 2.7 tons/cm$^2$. The molded products were sintered under a vacuum atmosphere at 1600° C for 180 minutes for the Comparative Example Run No.4 and at 1900° C. for 180 minutes for the other Runs, and the physical properties of the sintered products were measured in accordance with the Example 1. The results are shown in Table 3.

TABLE 3

| | Run No. | Composition (Wt. Part) | | | Relative Density (%) | Flexural Strength (MPa) | Thermal Impact Resistance ΔT(°C.) | Corrosion Resistance |
|---|---|---|---|---|---|---|---|---|
| | | $ZrB_2$ | $TiB_2$ | $Cr_3C_2$ | | | | |
| Comp. Ex. | 1 | 100 | — | — | 57.3 | 30 | 200 | Δ |
| | 2 | — | 100 | — | 86.7 | 150 | 250 | Δ |
| | 3 | 50 | 50 | — | 76.5 | 70 | 200 | Δ |
| | 4 | — | — | 100 | 96.6 | 10< | — | — |
| Ex. | 5 | 80 | 10 | 10 | 97.0 | 335 | 400 | |
| | 6 | 50 | 40 | 10 | 91.1 | 300 | 350 | |
| | 7 | 10 | 80 | 10 | 92.1 | 350 | 400 | |
| | 8 | 79.5 | 20 | 0.5 | 89.1 | 270 | 250 | |
| | 9 | 75 | 20 | 5 | 96.5 | 330 | 300 | |
| | 10 | 70 | 10 | 20 | 95.8 | 320 | 400 | |
| | 11 | 60 | 10 | 30 | 90.4 | 310 | 400 | |
| | 12 | 40 | 10 | 50 | 90.2 | 295 | 350 | |

It is seen from Table 3 that the present Example Run Nos. 5 to 12 are superior in corrosion resistance, thermal impact resistance, strength and density as compared to the Comparative Run Nos. 1 to 4.

Example 4

Powders of $ZrB_2$, $TiB_2$ and $Cr_3C_2$ of the Example 3 Run No.5 and the respective separate powders of BN, AlN, $B_4C$, SiC and TiC each having a purity of not less than 99% (mean particle size: 4 to 5 μm) were metered out each in a prescribed amount and mixed manually in a mortar. The resulting mixtures were molded by the CIP method (2.7 tons/cm$^2$, 3 min.) and sintered in vacuum at 1900° C. for 180 minutes. The physical properties of the mixtures are shown in Table 4.

The amounts of the additional starting powders BN, AlN, $B_4C$, SiC and TiC are expressed in terms of percent by weight based on the total weight of the starting powder material. In Table 4, the anti-oxidation properties were determined from the weight of the oxide produced when the samples were heat-treated at 1200° C. for 12 hours under an oxidizing atmosphere. In the Table, O, Δ and X stand for oxides not increased, oxides increased slightly and oxides increased markedly or oxides pulverized, respectively.

It is seen from Table 4 that the thermal impact resistance is increased markedly by the addition of BN while the hardness is also markedly increased by the addition of SiC and TiC. It is also seen that the strength, hardness and the thermal impact resistance become more balanced and that the excellent corrosion resistance is realized in all of the sintered products.

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A sintered body having high corrosion resistance and containing $ZrB_2$ obtained by sintering a starting powder material consisting essentially of 5 to 40% by weight of BN and not less than 50% by weight of a starting powder mixture consisting essentially of $Cr_3C_2$ and a boride represented by the formula $(XB_2)n$ wherein n represents an integer of 1 or 2 and when n is an integer equal to 1, X represents a zirconium atom and

TABLE 4

| Run No. | Additional Starting Powder (Wt. %) | | | | | Relative Density (%) | Flexural Strength (MPa) | Hardness (Hv) | Thermal Impact Resistance ΔT(°C.) | Anti-oxidation |
|---|---|---|---|---|---|---|---|---|---|---|
| | BN | AlN | $B_4C$ | SiC | TiC | | | | | |
| 1 | 40 | — | — | — | — | 79.8 | 80 | 900 | 700 | |
| 2 | 25 | — | — | — | — | 84.5 | 120 | 1100 | 700 | |
| 3 | 20 | — | — | — | — | 90.5 | 200 | 1100 | 600 | |
| 4 | 15 | — | — | — | — | 92.0 | 250 | 1200 | 550 | |
| 5 | 5 | — | — | — | — | 93.2 | 270 | 1400 | 500 | |
| 6 | — | 25 | — | — | — | 86.5 | 200 | 1850 | 350 | |
| 7 | — | 20 | — | — | — | 92.0 | 300 | 1900 | 400 | |
| 8 | — | 15 | — | — | — | 94.2 | 300 | 1850 | 350 | |
| 9 | — | 5 | — | — | — | 95.8 | 250 | 1850 | 350 | |
| 10 | — | — | 25 | — | — | 96.3 | 350 | 2700 | 400 | |
| 11 | — | — | 20 | — | — | 95.5 | 300 | 2600 | 350 | |
| 12 | — | — | 15 | — | — | 94.1 | 250 | 2600 | 350 | |
| 13 | — | — | 5 | — | — | 90.2 | 170 | 2200 | 350 | |
| 14 | — | — | — | 15 | — | 95.8 | 300 | 1800 | 350 | |
| 15 | — | — | — | 10 | — | 95.0 | 350 | 1850 | 300 | |
| 16 | — | — | — | 5 | — | 94.5 | 380 | 1800 | 350 | |
| 17 | — | — | — | — | 15 | 97.2 | 300 | 2000 | 350 | |
| 18 | — | — | — | — | 10 | 97.3 | 350 | 1950 | 350 | |
| 19 | — | — | — | — | 5 | 97.0 | 350 | 1900 | 450 | |
| 20 | 10 | 10 | — | — | — | 93.1 | 280 | 1500 | 500 | |
| 21 | 10 | — | 10 | — | — | 90.2 | 230 | 1800 | 450 | |
| 22 | 10 | — | — | 10 | — | 92.2 | 250 | 1700 | 400 | |
| 23 | 10 | — | — | — | 10 | 95.1 | 300 | 1700 | 400 | |
| 24 | 10 | — | 10 | — | 10 | 92.6 | 240 | 1800 | 400 | | when n is an integer equal to 2, X represents a zirconium atom and a titanium atom, respectively, and B represents a boron atom, the weight ratio of the $Cr_3C_2$: the boride being 50 to 0.5 : 30 to 99.5.

2. The sintered body according to claim 1 wherein said $Cr_3C_2$ and the boride each have a purity of not less than 99% and a mean particle size prior to sintering of not more than 10 μm.

3. The sintered body according to claim 1 obtained by sintering said starting powder material at pressureless conditions under an atmosphere selected from the group consisting of vacuum, argon, helium and nitrogen.

4. The sintered body according to claim 1 wherein said sintering is effected at 1400° to 2200° C. for 30 minutes to 6 hours.

5. The sintered body according to claim 1 wherein said starting powder material consists essentially of 5 to 40% by weight of BN, not more than 25% by weight of AlN and not less than 50% by weight of said starting powder mixture.

6. The sintered body according to claim 5 wherein said BN and AlN each have a purity of not less than 99% and a mean particle size prior to sintering of not more than 10μm.

* * * * *